3,642,874
β-HALOGENOALKYL ISOCYANATES
Klaus-Dieter Kampe, Frankfurt am Main, Germany, assignor to Farbwerke Hoechst Aktiengesellschaft vormals Meister Lucius & Bruning, Frankfurt am Main, Germany
No Drawing. Filed Sept. 12, 1969, Ser. No. 858,256
Claims priority, application Germany, Sept. 20, 1968, P 17 93 460.0
Int. Cl. C07c 119/04
U.S. Cl. 260—487          5 Claims

ABSTRACT OF THE DISCLOSURE

α-Carboalkoxy-β-halogenoalkyl isocyanates are obtained by rearrangement of N-halogeno - 4-carboalkoxy-azetidinones-(2) effected by radical-forming catalysts in the presence of unsaturated compounds as co-catalysts. Due to their three groups of different degrees of reactivity the products are useful intermediates for the synthesis of heterocyclic compounds.

---

The present invention relates to novel organic compounds characterized by bearing three functional groups of a different degree of reactivity. More specifically, it relates to α-carboalkoxy-β-halogenoalkyl isocyanates of the Formula I

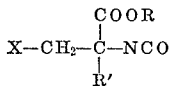

in which R is lower alkyl, R' is hydrogen or lower alkyl and X is chlorine or bromine. A further object is the preparation of said compounds by rearrangement of the corresponding N-halogeno-4-carboalkoxy-acetidinones-(2).

In my copending application Ser. No. 727,347, filed May 7, 1968, corresponding to Belgian Pat. No. 714,901, I have described and claimed a process for the preparation of β-halogenoalkyl isocyanates of the formula

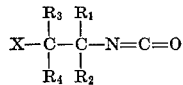

in which X is chlorine or bromine and $R_1$, $R_2$, $R_3$, and $R_4$ are hydrogen or an aliphatic, cycloaliphatic, araliphatic or aryl group which is inert towards isocyanate and in which $2R_1$, $R_2$, $R_3$ or $R_4$ together are lower alkylene, lower alkenylene or part of a polycyclic carbocyclic or heterocyclic ring system of up to 18 carbon atoms, which comprises reacting a lactam of the formula

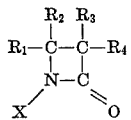

in which X, $R_1$, $R_2$, $R_3$, and $R_4$ have the meanings given above, in the presence of an alkene and/or an alkyne at a temperature of —30° to +250° C. with a radical-forming catalyst.

I now have found that α-carboalkoxy-β-halogeno-alkyl isocyanates of the formula

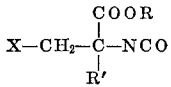

in which R is lower alkyl, R' is hydrogen or lower alkyl and X is chlorine or bromine, are obtained when rearranging β-lactams of the formula

in which R, R', — and X have the meanings given above, under the conditions as described above.

The N-halogeno-β-lactams of the general Formula II (X=preferably bromine) serving as the starting substances are prepared according to the methods known for the N-halogenation or N-bromination of lactams (cf., e.g. B. Taub and J. B. Hino, J. Org. Chem. 25,263 (1960); G. Caprara et al., Ann. Chimica 49, 1167 (1959)) by halogenation of the corresponding β-lactams with the equivalent amount of halogen in the presence of aqueous alkalies, preferably in the presence of sodium bicarbonate solution or of dilute soda solution. For the rearrangement reaction according to the invention, the unpurified N-halogeno-β-lactams obtained after the halogenation may be used.

The acetidine-2-one-4-carboxylic acids are obtainable by oxidizing the corresponding 4-vinyl-azetidine-2-ones, e.g. with potassium permanganate. These acids are esterified according to methods known in the art, e.g. by means of diazoalkanes.

4-vinyl-azetidine-2-ones are obtainable by reacting the corresponding 1,3-dienes with N-carbonyl-sulfamic acid chloride, e.g. by proceeding as described in German Offenlegungsschrift 1,445,789. Suitable 1,3-dienes are e.g. butadiene - 1,3, isoprene, 2-ethyl-butadiene-(1,3) or 2-butylbutadiene-(1,3) (cf. P. Goebel and K. Clauss, Liebigs Ann. Chem. 722, (1969) 122).

In principle all olefins and/or acetylenes may be used as cocatalysts which have one or several C—C double bonds and/or C—C triple bonds but no functional groups which would react with isocyanate groups. It is suitable to use olefins having a simple structure and which are accessible without great technical expenditure, for example ethylene, acetylene, propene, butene-(1), butene-(2), 4-methylpentene-(1), butadiene, isoprene, allyl chloride, allyl bromide, methallyl chloride, vinyl chloride, vinyl ethyl ether or vinyl acetate or mixtures of these olefins. Another reason for the suitability of these olefins is the possibility to separate them easily from the isocyanates by fractional distillation—if desired together with a solvent—at relatively low temperatures, considerably below the boiling point of the isocyanates which have formed.

The olefins and/or acetylenes necessary for the process are suitably introduced in quantities of 0.02 to 3 moles per mole of N-bromo- or N-chloro-β-lactam of Formula II. If the process is carried out without solvents, it is suitable to add the required C—C-unsaturated compound in quantities of 0.3 to 3 moles per mole of N-bromo- or N-chloro-β-lactam. When carrying through the process in the presence of the solvents described above, the amount of solvents used per mole of N-bromo- or N-chloro-β-lactam is, in principle, not limited. It is suitable to use the solvents in quantities of 0.3 to 50 parts by weight per part by weight of the N-bromo- or N-chloro-β-lactam to be rearranged.

The process according to the invention for preparing β-halogenoalkyl-isocyanates may also be carried out simultaneously using the C—C-unsaturated component as solvent; in this case, this component is advantageously used in a quantity of 0.6–5.0 parts by weight per part by weight of N-halogeno-azetidinone-(2). Accordingly, there are preferably used unsaturated compounds having a boiling point below 170° C. under normal pressure. For this method of operation, olefins that are rather slowly polymerizing, for example allyl chloride, alkenes-(2) and cycloalkenes having a boiling point in the range of from 25 to 150° C., and/or allyl esters of lower aliphatic carboxylic acids, for example allyl acetate are suitable.

As radical-forming catalysts there may be used in the process of the present invention all compounds which decompose, while forming radicals, at temperatures in the range of from −30° C. to +250° C., preferably +10° to +150° C. Such radical formers preferred in the process of the present invention are, for example, organic peroxides and/or hydroperoxides, hydrogen peroxide, inorganic peroxide compounds and/or bisazo-iso-butyronitrile. Appropriate organic peroxides are, for example, di-tert.-butyl peroxide, dibenzoyl peroxide, dilauroyl peroxide, diisopropyl-percarbonate, tert.-butyl-hydroperoxide, cumyl-hydroperoxide, pinane-hydroperoxide, tert.-butyl perbenzoate and methyl-ethyl-ketone peroxide.

The radical-forming catalysts used in the process of the present invention are advantageously used in quantities of 0.002 to 0.2 molar percent, referred to the N-bromo- or N-chloro-$\beta$-lactam quantity of Formula II.

It is of advantage to effect the rearrangement reaction of the N-bromo- or N-chloro-$\beta$-lactams in the presence of a solvent which is inert towards the isocyanate group. Especially suitable solvents are carbon tetrachloride, chloroform, methylene chloride, 1,2-dichloroethane, symmetric difluoro-tetrachloro-ethane, tetrachloro-ethylene and 1,4-dichloro-butane, or mixtures of these compounds. If the process of the invention is carried out in solution at temperatures above 100° C. it is advantageous to use as solvents hydrocarbons or ethers with a higher boiling point, for example dioxane or diglycol-dimethyl ether.

The preparation of the isocyanates of the present invention is extremely simple. The N-bromo-azetidinone-(2) or the N-chloro-azetidinone-(2) of Formula II is left for a period of about 30 minutes to several days at an appropriate reaction temperature, preferably between +10° and +150° C., in the presence of catalytic amounts of the radical donator and under the addition of an olefin and/or acetylene as cocatalyst, preferably in the presence of one of the solvents mentioned above. The reaction velocity of the rearrangement reaction under formation of the $\beta$-bromo- or $\beta$-chloro-alkyl-isocyanates, of Formula I rises with the reaction temperature, with the amount of catalysts and with the concentration of the olefin or acetylene component. The velocity of the rearrangement of the different N-bromo- and N-chloro-$\beta$-lactams is different. In general, the N-chloro-$\beta$-lactams rearrange much slower than the corresponding N-bromo-compounds. But it is also the substitution degree of the $\beta$-lactam ring which influences the rearrangement velocity. When choosing the reaction temperature it is of advantage to consider the thermal stability of the N-bromo- or N-chloro-$\beta$-lactams. These compounds are more or less thermally sensitive; in general, the N-chloro-compounds are thermally more stable than the corresponding N-bromo-compounds. The thermal stability rises with the elevation of the degree of substitution of the N-bromo- or N-chloro-$\beta$-lactams.

Because of the aforementioned influences, the optimum conditions for the rearrangement of the present invention for the different N-bromo and N-chloro-$\beta$-lactams of Formula II are very different; they are within a large range of temperature and require reaction times of different length.

After the rearrangement reaction, the solvent or solvents, if present, are suitably removed by distillation in vacuo and the reaction products are subjected to a fractional vacuum distillation. In some cases different amounts of a solid by-product are obtained in the rearrangement reaction. In such cases the solvent, which may be present, is evaporated under normal or reduced pressure, the residue is digested with an ether which is liquid at room temperature and which has a low boiling point or with a $C_5$–$C_7$ hydrocarbon and the solution is filtered with suction from the solid substance. The isocyanates formed are then in solution and are obtained in pure form by fractional distillation.

It is of advantage to carry out the rearrangement according to the invention of the, preferably used, N-bromo-$\beta$-lactams of the general Formula II at a relatively high radical concentration, which considerably reduces the reaction time. In this method of operation, it is suitable to use radical donators whose decomposition half-life periods in the temperature range of from 30 to 65° C. are between 4 hours and 20 minutes, for example bis-(2,4-dichloro-benzoyl)-peroxide and di-isopropyl-peroxy-dicarbonate. Further, in this method of operation, it is suitable to add the N-bromo-azetidinone-(2) to a solution consisting of the catalyst and an unsaturated component and, optionally, of a solvent at a temperature in the range of from 35 to 65° C. In this method, the exothermic rearrangement reaction proceeds within periods ranging between 10 minutes and 1½ hours, in easily controllable manner and with yields of up to 93% of the theory of isocyanate. The radical-forming catalysts are used in this advantageous method of operation in quantities of 0.1 to 1.5 mol-percent per mole of N-bromo-azetidinone-(2).

As isocyanates having two additional reactive modifiable groups, the ($\beta$-halogeno-$\alpha$-carboalkoxy-alkyl)-isocyanates which can be prepared according to the present invention are valuable intermediate products and can be used in very many fields of application. These substituted isocyanates are derivatives of special $\alpha$-amino-acids; in the form of the corresponding carbamic acid esters, they can be very easily cyclisized thermally to pharmaceutically active oxazolidone-(2) according to the method used for the first time by E. Katchalski (J. Org. Chem., 15, 1067 (1950)).

The following examples illustrate the invention but they are not intended to limit it thereto:

EXAMPLE 1

$\alpha$-Carbomethoxy-$\beta$-bromo-ethyl isocyanate (a) Preparation of N-bromo-4-carbomethoxy-azetidinone-(2).—A solution of 5.1 ml. (16 g.; 0.1 mole) of bromine in 30 ml. of methylene chloride was added dropwise, while stirring vigorously, at room temperature, in the course of 30 minutes, to a mixture of 13 g. (0.1 mole) of 4-carbomethoxy-azetidinone-(2), 12.6 g. of sodium-hydrogen-carbonate (0.15 mole), 150 ml. of methylene chloride and 60 ml. of water, and the whole was then stirred for 1 hour at room temperature. The whole was then filtered with suction, the filter residue was washed with a small amount of methylene chloride, the phases of the filtrate were separated and the aqueous phase was shaken twice with methylene chloride. The methylene chloride extracts were combined with the corresponding phase from the filtrate of the reaction mixture, dried over sodium sulfate, filtered off and evaporated under reduced pressure at a temperature of the bath of 38–40° C. As residue, there remained behind 21–22 g. of crude N-bromo-4-carbomethoxyazetidinone-(2) in the form of a viscous yellow brown oil. This product was used, without being purified, as starting material for the rearrangement reaction.

(b) Rearrangement of the N-bromo-4-carbomethoxy-azetidinone-(2).—A mixture of 44 g. (about 0.2 mole) of crude N-bromo-4-carbomethoxy-azetidinone-(2), as that obtained by the bromination described under (a), 240 ml. of chloroform, 18.4 g. (0.2 mole) of methallyl chloride and 130 mg. of dilauroyl peroxide was boiled for 17 hours under reflux. The low boiling parts of the reaction mixture were then removed by distillation under reduced pressure at a temperature of the bath of 40° C. The oily residue was then subjected to fractional distillation under reduced pressure on a 10 cm. long Vigreux column. One fraction boiling between 77 and 84° C. under a pressure of 2.5 torr consisted of about 87 to 90% α-carbomethoxy-β-bromo-ethylisocyanate. This fraction was again subjected to fractional distillation; 26.2 g. of pure (α-carbomethoxy-β-bromo-ethyl)isocyanate were obtained. Boiling point: 55° C. under a pressure of 0.2 mm. Hg. Melting point: 28–30° C. $n_D^{30}$: 1.4734.

Elementary composition in percent: Found: C, 29.1; H, 2.9; Br, 38.8; N, 6.7. Calculated for $C_5H_6BrNO_3$: C, 28.87; H, 2.91; Br, 38.42; N, 6.73.

Molecular weight: calc. 208.03. Found: 209.

The infrared and the $^1H$-NMR spectrum correspond with the structure.

EXAMPLE 2

0.2 mole of 4-carbomethoxy-azetidinone-(2) were converted as described under (a) in Example 1 into the N-bromo derivative. A solution of about 42–44 g. of crude N-bromo - 4 - carbomethoxy-azetidinone-(2) (0.2 mole) in 50 ml. of chloroform was added dropwise, while stirring, in the course of 15 minutes, to a mixture of 80 ml. of chloroform, 20 ml. of methallyl chloride and 0.4 g. of a 20% solution of diisopropyl-peroxy-di-carbonate in dibutyl maleate (0.2 mol-percent radical former), that had been heated to 61° C. The whole was then stirred for 40 minutes at the same temperature. The low boiling portions were then evaporated on a rotatory evaporator under reduced pressure and at a bath temperature of 40° C. The residue was subjected to fractional distillation under reduced pressure as described in Example 1. After re-distillation, 28.7 g. (69% of the theory) of pure α-carbomethoxy-β-bromoethyl isocyanate were obtained.

EXAMPLE 3

0.2 mole of 4-carbomethoxy-azetidinone-(2) were converted as described under (a) in Example 1 into the N-bromo-derivative. A solution of about 42–44 g. of crude N-bromo - 4 - carbomethoxyazetidinone-(2) (0.2 mole) in 40 ml. chloroform was added dropwise, while stirring, in the course of 20 minutes, to a mixture heated to 50° C. of 80 ml. of chloroform, 25 ml. of allyl chloride (0.3 mole) and 1.31 g. of a 44% solution of di-isopropyl-peroxy dicarbonate in carbon tetrachloride (1.4 mol-percent radical former). The reaction mixture was then stirred for 10 minutes at the same temperature and subsequently evaporated under reduced pressure and at a bath temperature of 40° C. The remaining residue was subjected, as described in Examples 1 and 2, to fractional distillation. 29 g. (70% of the theory) of pure α-carbomethoxy-β-bromoethyl isocyaanate were obtained.

EXAMPLE 4

(α-Carbomethoxy-β-bromo-isopropyl)-isocyanate (a) Preparation of the N-bromo - 4 - methyl - 4 - carbomethoxy-azetidinone-(2).—A solution of 160 g. (51 ml.) of bromine in 150 ml. of methylene chloride was added dropwise, while stirring vigourously, at room temperature, in the course of 30 minutes, to a mixture of 143 g. (1 mole) of 4-methyl - carbomethoxy-azetidinone-(2), 120 g. (1.45 mole) of sodium bicarbonate, 1 liter of methylene chloride and 400 ml. of water, and the whole was then stirred for 2 hours at room temperature. Further working up until isolation of the crude N-bromo-4-methyl-4-carbomethoxy-azetidinone-(2) was effected in the manner described under (a) in Example 1.

(b) Rearrangement of the N-bromo - 4 - methyl-4-carbomethoxy-azetidinone-(2).—A solution of 1 mole of crude N-bromo-4-methyl - 4 - carbomethoxy-azetidinone-(2), as that obtained by the bromination of 1 mol of β-lactam according to (a), in 100 ml. of chloroform was added dropwise, while stirring, in the course of 20 minutes, to a mixture heated to 60° C. of 400 ml. of chloroform, 100 ml. (1 mol) of methallyl chloride and 2 g. of a 20% solution of diisopropyl-peroxy-dicarbonate in dibutyl maleate (0.2 mol-percent radical former). The temperature of the reaction mixture thereby rose to 66–68° C. The whole was stirred for 40 minutes at a temperature of the bath of 60° C. and then evaporated under reduced pressure. The remaining residue was distilled on a 30 cm. column. The fraction which passed at 1 torr between 56 and 70° C. was re-distilled on a similar column under reduced pressure. A fraction passing over at 0.4 torr and 52° C. constituted the pure isocyanate. 183 g. (83% of the theory) of pure (α-carbomethoxy-β-bromoisopropyl)-isocyanate were obtained. Boiling point: 52° C. under a pressure of 0.4 mm. Hg; $n_D^{20}$: 1.4680.

Elementary composition in percent: C, 32.5; H, 3.7; Br, 36.4; N, 6.6. Calculated for $C_6H_8BrNO_3$: C, 32.46; H, 3.63; Br, 35.99; N, 6.31.

Molecular weight: 222.05 (calcd.). Found: 221.

The infrared spectrum and the $^1H$-NMR-spectrum correspond to the structure of the isocyanate.

EXAMPLE 5

1 mole of 4 - methyl - 4 - carbomethoxy - azetidinone-(2) was converted as described in the preceding examples into the N-bromo-derivative. A solution of 1 mole of crude N-bromo - 4 - methyl - 4 - carbomethoxy-azetidinone-(2) in 100 ml. of chloroform was added dropwise, while stirring, in the course of 30 minutes, to a mixture heated to 65–68° C. of 200 ml. of chloroform, 200 ml. of 1,2-dichloroethane, 100 ml. of methallyl chloride, and 5 g. of a 50% paste of bis-(2,4-dichlorobenzoyl)-peroxide in silicone oil (0.65 mol-percent radical former). The whole was stirred for 2 hours at 70° C. bath temperature. The working up of the reaction mixture and the isolation of the pure β-bromo-α-carbomethoxy-isopropyl isocyanate were effected as described in Example 4. After redistillation, the (α - carbomethoxy-β-bromo-isopropyl)-isocyanate was obtained in yields of 65–68%.

EXAMPLE 6

72 g. (0.5 mole) of 4 - methyl - 4 - carbomethoxy-azetidinone-(2) were converted as described under (a) in Example 4 into the N-bromo-derivative. A solution of 0.5 mole of the crude N-bromo - 4 - methyl - 4 - carbomethoxy-azetidinone in 50 ml. of cyclohexene was added dropwise, while stirring, in the course of 20 minutes, to a mixture heated to 56–59° C. of 200 ml. of cyclohexene and 2.6 g. (2 ml.) of a 44% solution of diisopropyl-peroxy dicarbonate in carbon tetrachloride (1.12 mol-percent radical former). The whole was stirred for 40 minutes at about 57° C. and a large part of cyclohexene was eliminated from the reaction mixture by distillation under a pressure of about 100–130 torr, while stirring. The residue was subjected to fractional distillation as described in Example 4 and then re-distilled. About 82–86 g. (74–78% of the theory) of pure (α-carbomethoxy-β-bromo-isopropyl)-isocyanate were obtained.

EXAMPLE 7

78.5 g. (0.5 mole) of 4-methyl-4-carboethoxy-azetidinone-(2) were converted as described in the preceding examples into the N-bromo-derivative and the crude N-bromo - 4 - methyl - 4 - carboethoxy-azetidinone - (2) was rearranged into the isocyanate according to the method described in Example 4. After distillation and re-distillation under reduced pressure, 102 g. (86% of the theory) of pure (β - bromo - α - carboethoxy - isopropyl)-isocyanate were obtained. Boiling point: 70–71° C. under a pressure of 0.6 mm. Hg; $n_D^{20}$=1.4629. Infrared spectrum: C=O (NCO) 4.42μ; C=O ($COOC_2H_5$) 5.74μ.

Elementary composition in percent: C, 35.5; H, 4.3; Br, 34.1; N, 5.6. Calculated for $C_7H_{10}BrNO_3$: C, 35.61; H, 4.27; Br, 33.85; N, 5.93.

Molecular weight: 234.07. Molecular weight found: 235.

I claim:
1. A compound of the formula

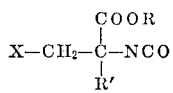

in which R is lower alkyl, R' is hydrogen or lower alkyl and X is chlorine or bromine.

2. The compound as claimed in claim 1, wherein R is lower alkyl, R' is hydrogen or lower alkyl and X is bromine.

3. The compound as claimed in claim 2, wherein R is methyl and R' is hydrogen.

4. The compound as claimed in claim 2, wherein R is ethyl and R' is methyl.

5. The compound as claimed in claim 2, wherein R and R' are methyl.

References Cited

UNITED STATES PATENTS

| | | | |
|---|---|---|---|
| 2,627,487 | 2/1953 | Drake et al. | 260—482 R |
| 3,168,545 | 2/1965 | Harper | 260—482 R |
| 3,437,680 | 4/1969 | Farrissey et al. | 260—487 |

LORRAINE A. WEINBERGER, Primary Examiner

P. J. KILLOS, Assistant Examiner

U.S. Cl. X.R.

260—239 A, 307 C